Sept. 21, 1943.  J. A. VAN DEN AKKER  2,329,959
APPARATUS FOR MEASURING THE WATER RESISTANCE OF PAPER
Filed March 15, 1940  4 Sheets-Sheet 1

JOHANNES A. VAN DEN AKKER
INVENTOR

BY Cleveland B. Hallenbeck.

ATTORNEY

Sept. 21, 1943.  J. A. VAN DEN AKKER  2,329,959
APPARATUS FOR MEASURING THE WATER RESISTANCE OF PAPER
Filed March 15, 1940  4 Sheets-Sheet 2
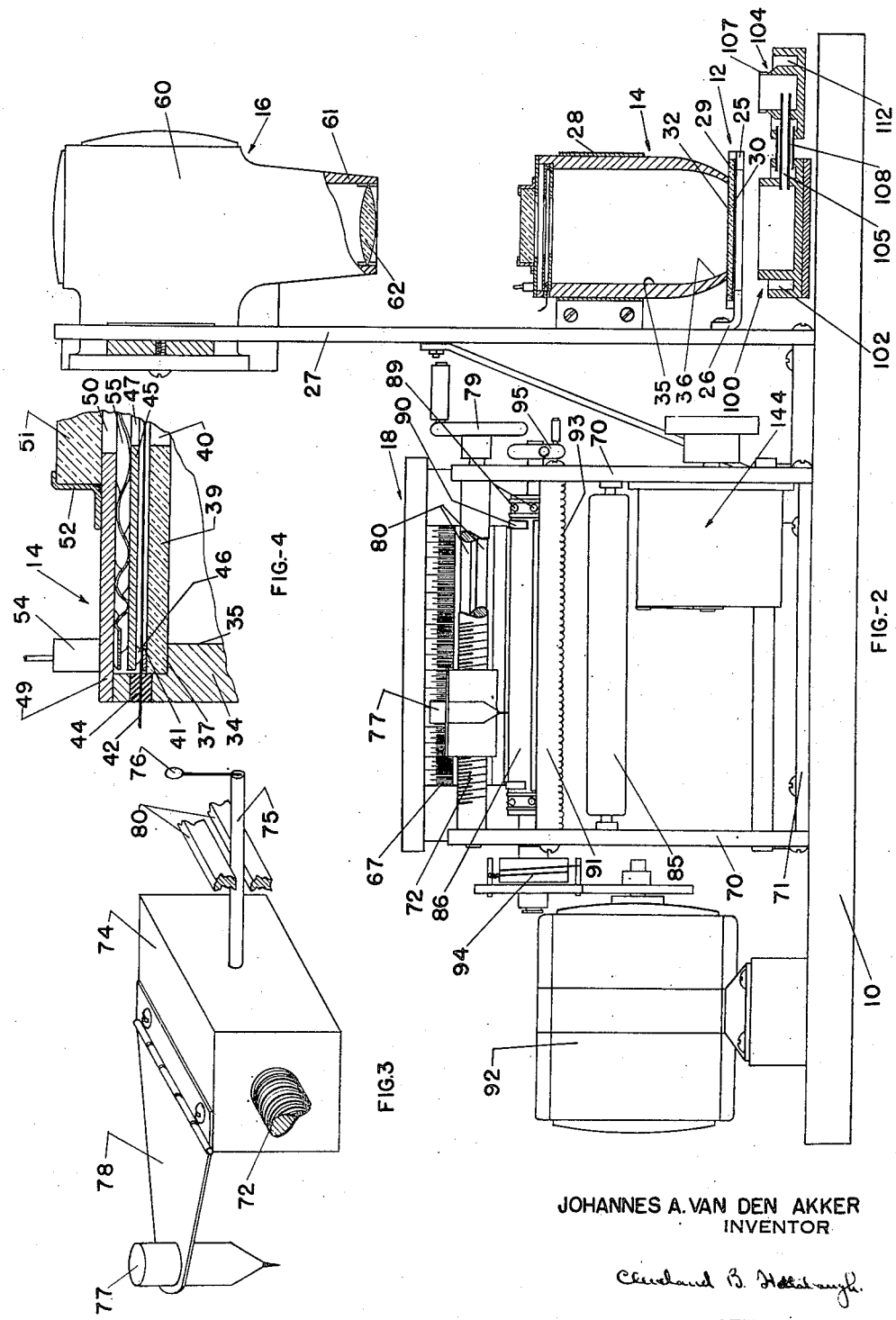
JOHANNES A. VAN DEN AKKER
INVENTOR
ATTORNEY Sept. 21, 1943.    J. A. VAN DEN AKKER    2,329,959
APPARATUS FOR MEASURING THE WATER RESISTANCE OF PAPER
Filed March 15, 1940    4 Sheets-Sheet 3

JOHANNES A. VAN DEN AKKER
INVENTOR

Cleveland B. Hallabaugh
ATTORNEY

Patented Sept. 21, 1943

2,329,959

UNITED STATES PATENT OFFICE 2,329,959

APPARATUS FOR MEASURING THE WATER RESISTANCE OF PAPER

Johannes A. Van den Akker, Appleton, Wis., assignor to The Institute of Paper Chemistry, Appleton, Wis., a corporation of Wisconsin Application March 15, 1940, Serial No. 324,106

6 Claims. (Cl. 73—51)

The present invention relates to apparatus for measuring the liquid resistance of paper, cardboard, or the like, and is an improvement upon the apparatus shown and described in my co-pending application, Serial Number 289,842, filed August 12, 1939, now U. S. Patent No. 2,253,356, issued August 19, 1941.

More particularly, the invention relates to apparatus for testing the resistance of paper and the like, to transudation of liquids. By the term "transudation of liquid" is meant the passing of liquid through the pores, interstices, or fibers of a web such as a sheet of paper. This term should be clearly differentiated from what is commonly called "vapor transmission."

An object of the present invention is to provide an improved apparatus for measuring the resistance of paper to the transudation of liquids such as water, oil or the like.

Another object is to provide an apparatus for the foregoing purpose, which is simple and economical in construction.

Another object is to provide an apparatus which reduces personal error to a minimum and can be easily operated to obtain accurate results, even by unskilled operators.

A further object is to provide an apparatus for measuring the time required for liquid to transude, which is not subject to error due to changes in temperature of the liquid during the test or vapor rising from the liquid.

A still further object is to provide an apparatus which can be operated under standardized conditions and give results which establish an accurate comparison.

Other and further objects of the invention will be obvious upon an understanding of the illustrative embodiment about to be described, or will be indicated in the appended claims, and various advantages not referred to herein will occur to one skilled in the art upon employment of the invention in practice.

These objects, generally, are accomplished by applying to a sheet of paper, an indicator, such as a dye, having a distinct change in fluorescent characteristics or which will fluoresce strongly when brought into solution with the penetrating liquid. The underside of the paper is then wetted by bringing a liquid contained in a receptacle into contact with the sheet. Preferably, the sheet is illuminated by a source of near ultra-violet light and the intensity of fluorescence as the liquid transudes is detected by a photocell which is connected to an electrical instrument adapted to provide a visible reading of the intensity of fluorescence. In order to record the reading of the instrument, a marking implement alignable with the indicator of the instrument is mounted so that it may be moved to follow the indicator. Underneath the marking implement a recording chart is provided which is moved by suitable means with respect to the implement at a known and constant rate of speed whereby the changes in intensity of fluorescence may be recorded as a function of time. The apparatus further is provided with a device for moving the liquid receptacle towards the sheet to be tested and this device operates a switch which initiates operation of the chart moving means the instant the liquid contacts the underside of the sheet. The apparatus also may be provided with means for regulating the sensitivity of the electrical instrument and the photocell, means for controlling the intensity of the ultra-violet light, means for maintaining the temperature, purity and contacting action of the liquid constant, whereby accurate results are attained in every instance.

An embodiment of the invention has been chosen for purposes of illustration and description and is shown in the accompanying drawings, forming a part of the specification, wherein Fig. 1 is a perspective view of an apparatus illustrating a preferred embodiment of the invention;

Fig. 2 is a front elevational view, partly in section of the apparatus shown in Fig. 1.

Fig. 3 is a fragmentary enlarged perspective view of the recording means;

Fig. 4 is a fragmentary enlarged sectional view of the photocell shown in Fig. 2;

Figure 1:
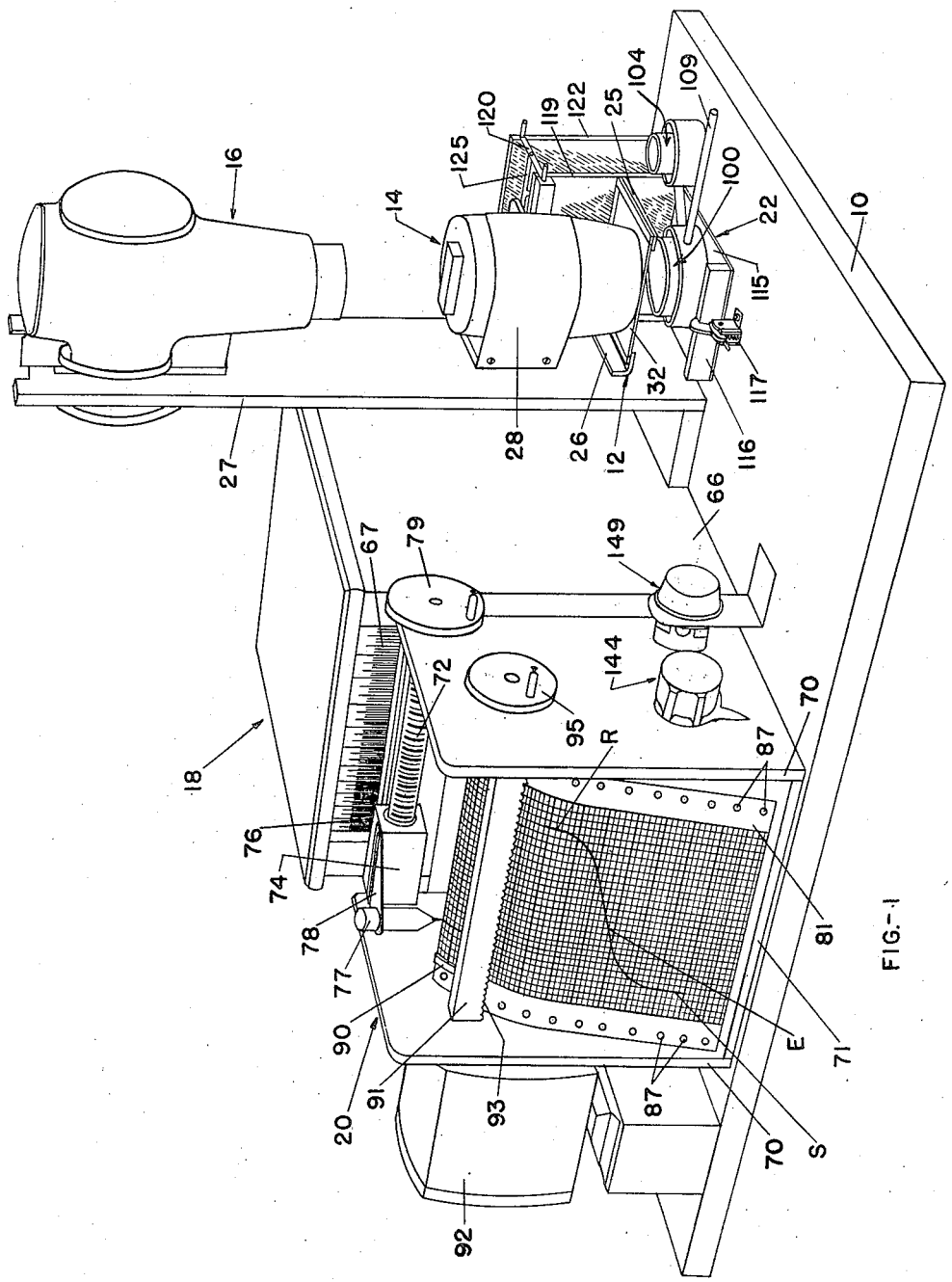

Referring more particularly to Figs. 1 to 6 of the drawings there is shown an apparatus for testing the resistance to liquid transudation of paper, cardboard, or other cellulosic materials, or the like. The apparatus comprises a base 10 upon which may be mounted a sample holder 12 for a sheet of paper to be tested, a photocell 14, a source of near ultra-violet light 16, a galvanometer 18, a recording mechanism 20, and suitable means 22 for wetting the paper to be tested. These parts will now be described in detail.

The sample holder 12 comprises a substantially rectangular frame 25 having three sides and one of the sides is secured to a bracket 26 attached to an upright supporting member 27 which is secured to the base 10. The sides 25 of the frame each has a shelf portion 29 for supporting a sheet of paper 30 to be tested. A fluorescent indicator, described in detail hereinafter, is applied to the upper surface of the sheet and to prevent the indicator from being adversely affected by ambient vapor in the atmosphere during the test, a sheet of glass 32 or other suitable transparent material is placed over the sheet and is retained by the frame.

When the underside of the sheet is wetted and liquid transudes, and, in turn, wets the indicator, the indicator fluoresces and the intensity of this fluorescence is detected by the photocell 14 which is secured to the support 27 by a holder 28 and is directly above the sample holder with the lower end of its housing almost in contact with the glass 32.

The photocell (Figs. 2 and 4) is preferably mounted in a reflecting tubular housing 34 having an inner surface 35 which is mirrored or highly polished. The housing is generally cylindrical with its lower portion 36 curved inwardly toward the axis. Preferably, the housing is made of brass and the interior has a specular surface free of local undulations. This surface may be electroplated with chromium or other metal having a high coefficient of reflection. This metal may be varied to obtain high reflection of specific wave lengths. The housing, in this manner, is designed to reflect and direct substantially all rays leaving the fluorescing indicator to the sensitive surface of the photocell element 45.

At the upper end, the interior of the housing is recessed to provide an annular shoulder 37 for supporting a filter disk 39. The disk 39 has a central rectangular slot or opening 40 and is formed of a transparent material adapted to transmit freely the fluorescent light waves but to block ultra-violet and visible light waves other than the fluorescent light waves. A thin annular contact ring 41, preferably of phosphor bronze, is positioned on the disk 39 adjacent its outer periphery and the ring is electrically connected by a wire 42 extending through a tubular insulator 44 in the upper portion of the housing. Resting on the ring 41 is a circular photocell element 45 having a thin circular metal ring 46 annular in form on which contacts the ring 41 (Fig. 4). The photocell element has a central rectangular slot or opening 47 which preferably is the same size and is aligned with the slot 40 of the filter disk 39.

The top of the housing is closed by means of a cover plate 49 formed of material which is a good electrical conductor. The cover plate also has a central rectangular slot or opening 50 which is aligned with the slots 40 and 47 of the disk 39 and photocell element 45 respectively, but is slightly larger. Over this opening there is positioned a filter 51 having a high transmission for wavelengths in the ultra-violet and a negligible transmission for wavelengths greater than about 420 millimicrons. Suitable metal clamps 52 secured to the top of the cover plate 49 hold the filter 51 in position.

The upper side of the photocell element 45 may be electrically connected to a binding post 54 mounted on the cover plate through an annular ring 55 which is preferably made of phosphor bronze. Ring 55 is positioned intermediate to the cover plate and photocell element and, formed in a reversely curved manner to make it resilient, whereby it is capable of exerting downward pressure on the outer periphery of the photocell element (Fig. 4).

The source of ultra-violet light 16 (Figs. 1 and 2) may be a lamp unit, of the capillary mercury arc type, which emits a beam of light having high intensity in the near ultra-violet portion of the spectrum. This unit comprises a housing 60 having a downwardly depending sleeve 61, a high pressure mercury arc in a quartz burner, and a quartz double convex lens 62 positioned in the sleeve for directing a beam of ultra-violet light downwardly. The lamp unit is attached to the upright supporting member 27, above and in vertical alignment with photocell 14 so that the beam of ultra-violet light is adapted to pass through filter 51, the slots 40, 47, and 50 of the filter 39 (in the plane of which the image of the arc is focused), the photocell element 45 and the cover plate 49, respectively, and be incident upon the sample 30 beneath the photocell to excite the indicator thereon.

The fluorescence detected by the photocell 45 is measured by the galvanometer 18 which comprises a box-like case 66 having a linear scale 67 at the upper portion of the front thereof, and electrically responsive means in the case for moving an indicator such as a pointer or needle or an illuminated spot across the scale.

The galvanometer reading is adapted to be recorded by the recording mechanism 20, positioned on the base 10 in front of the galvanometer case 66. The recording mechanism illustrated (Figs. 1 and 2), preferably, comprises a pair of spaced apart upright side panels 70 secured to a base member 71; a screw or spiral 72 rotatable supported by the side panels 70 in parallel and adjacent relation to the galvanometer scale; a nut member or threaded block 74 carried by the screw and having a pointer rod 75 thereon provided with a sighting eyelet 76 adapted to be aligned with the indicator of the galvanometer; and a marking implement 77, such as a fountain pen or the like, which is supported by a bracket 78 hinged on the block 74. In order to enable the pointer 75 to be moved and follow the galvanometer indicator, a crank wheel 79 is secured to one end of the screw 72. By rotating the crank wheel, the screw is threaded through the block to move the block in a course parallel to the galvanometer scale. To prevent rotation of the block the pointer rod may be arranged between a pair of bars 80 on the galvanometer case adjacent the scale, or if desired the block may be provided with a slot for receiving a guiding rod, or rib, extending parallel to the screw (not shown).

The movement of the galvanometer indicator may be recorded on a chart 81 moved longitudinally beneath the pen while the pen is moved transversely across the chart by the block 74. This may be accomplished by providing a roll of chart paper on a roller 85 (Fig. 2) and utilizing a feed roller 86, unwinding the roll of paper and moving it beneath the pen. These rollers 85 and 86 extend between and are supported by the side panels 70. Preferably, the chart paper has apertures 87 adjacent its side edges into which spurs 89 on the feed roll may extend to positively feed the paper. Also, suitable accurate spring clamps 90 may be provided to hold the paper against the feed roll adjacent the spurs to prevent slip. The paper may be held downwardly at the front of the feed roll by a bar 91 having a serrated knife edge 93 adapted to facilitate tearing off portions of the paper roll.

In order to rotate the feed roll 86, a constant speed motor 92 is operatively connected to one end of the roll through suitable reducing gears (included in case of motor and not shown) and a friction drive 94 adapted to rotate the roll at a speed of one revolution per minute (Fig. 2). At the other end of the feed roll a crank 95 may be provided for manually feeding the paper. The crank 95 enables the chart paper to be moved backwards or forward and enables the operator to quickly set the paper so that the pen will start on a cardinal division. Chart paper used is preferably provided with divisions which each may represent two seconds of time, so that time may be read from the chart with speed and accuracy.

The means for wetting the underside of the sample to cause liquid, for example, water, to transude through the sample and thereby produce the fluorescence which is then detected and recorded, may be a cup 100 (Figs. 1, 2, 5, and 6) positioned beneath the sample holder. The cup has an inlet conduit 101 (Fig. 6) preferably formed of rubber, a catch basin 102 for receiving the water overflowing the rim of the cup 100, and an outlet conduit 103 connected to the catch basin. An auxiliary cup 104 is connected to the cup 100 by a conduit 105 and has an overflow catch basin 112 connected to the catch basin 102 of the cup 100 by a conduit 108 (Figs. 2 and 6). The rim of the auxiliary cup 104 extends slightly further upward than the rim of the cup 100 so that the auxiliary cup provides a constant and reproducible head of water of about $1/16$ of an inch for the cup 100. A strip of blotting paper 106 extends about the rim of the cup 104 and is held in place by a ring 107. The blotting paper prevents the surface of the water from rising above the edge of the rim, thereby rendering the water level constant.

The cup 100 may further be provided with a thermometer 109 having its bulb projecting into the cup just below the liquid level. By observing the thermometer, the temperature of the water may be noted and to standardize the tests, samples are tested only when the water circulated is at a given predetermined temperature.

Figure 5:
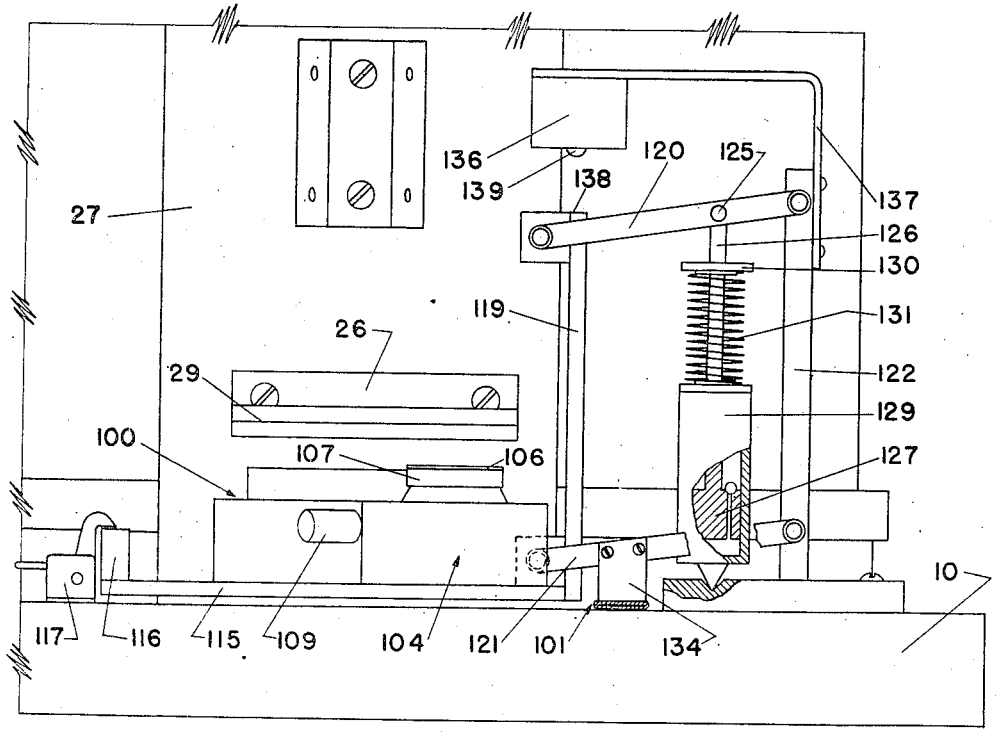
Fig. 5 is a fragmentary side elevational view, partly in section, illustrating the device for raising and lowering the liquid receptacle.
Figure 6:
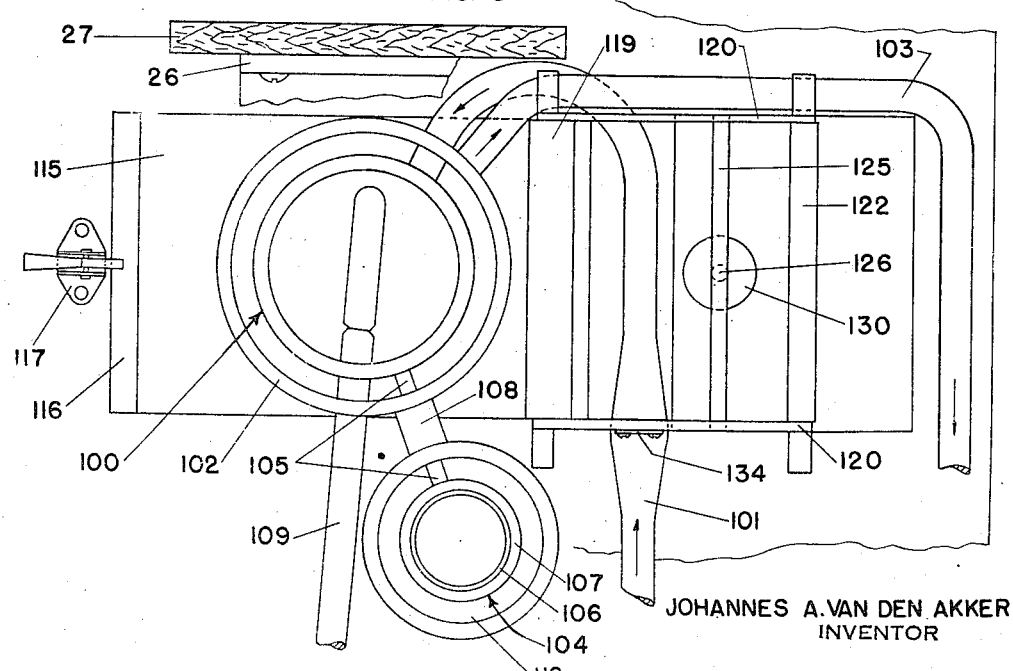
Fig. 6 is a top plan view of the device shown in Fig. 5.

The cup assembly is adapted to be raised to bring the liquid in the cup 100 in contact with the sample and is adapted to be lowered at the completion of the test (Fig. 5). To accomplish this the cup 100 is mounted on a platform 115 of a carriage or frame. At the front end of the platform an upwardly extending ledge 116 or the like is provided which is adapted to be engaged by a latch 117 or a suitable locking device for holding the carriage in its lower position. At the other end of the platform 115 there is upright member 119 having a pair of links 120, each pivotally connected thereto at one side adjacent the upper end and a second pair of links 121 each pivotally connected at one side adjacent the lower end. The other ends of the links 120 and 121 are pivotally connected adjacent the upper and lower ends respectively of an upright supporting member 122 secured to the base 10. The respective pairs of links are arranged in parallel relation so that when they are oscillated they are adapted to raise and lower the upright member 119 of the carriage.

The upper links 120 preferably are connected by a crosspiece 125 having a piston rod 126 connected thereto (Figs. 5 and 6). The piston rod 126 has a piston 127 at its lower end positioned in a dash pot cylinder 129 and has adjacent its upper end a flange 130. Intermediate the flange and an upper end of the dash pot cylinder, a resilient member, such as a spiral spring 131, extends about the piston rod. This spring is compressed when the carriage is in its lower position and is thereby adapted to expand and raise the carriage when the latch 117 is released. The tension of the spring and the retarding action of the dash pot preferably are so adjusted that the carriage moves upwardly slowly to prevent the water in the cups from being spilled.

The movement of the carriage may also be utilized for shutting off the water supply of the cups when the apparatus is not in use. This may be accomplished by positioning the rubber inlet conduit 101 beneath the lower links 121 and providing one or both lower links with a foot 134 adapted to pinch the conduit when the cup carriage is down and thereby shut off the flow of water (Fig. 5).

The movement of the carriage may further be utilized for initiating operation of the motor 92 of the recording mechanism 20. To effect this a switch 136, of the push button type is supported by a bracket 137 secured to the stationary supporting member 122 (Fig. 5) and is positioned above the upper end of the movable carriage upright 119 which, when in its upper position, engages the push button 139 and closes the switch. When the carriage is in its lower position, a spring opens the switch, whereby the motor is electrically disconnected.

Figure 7:
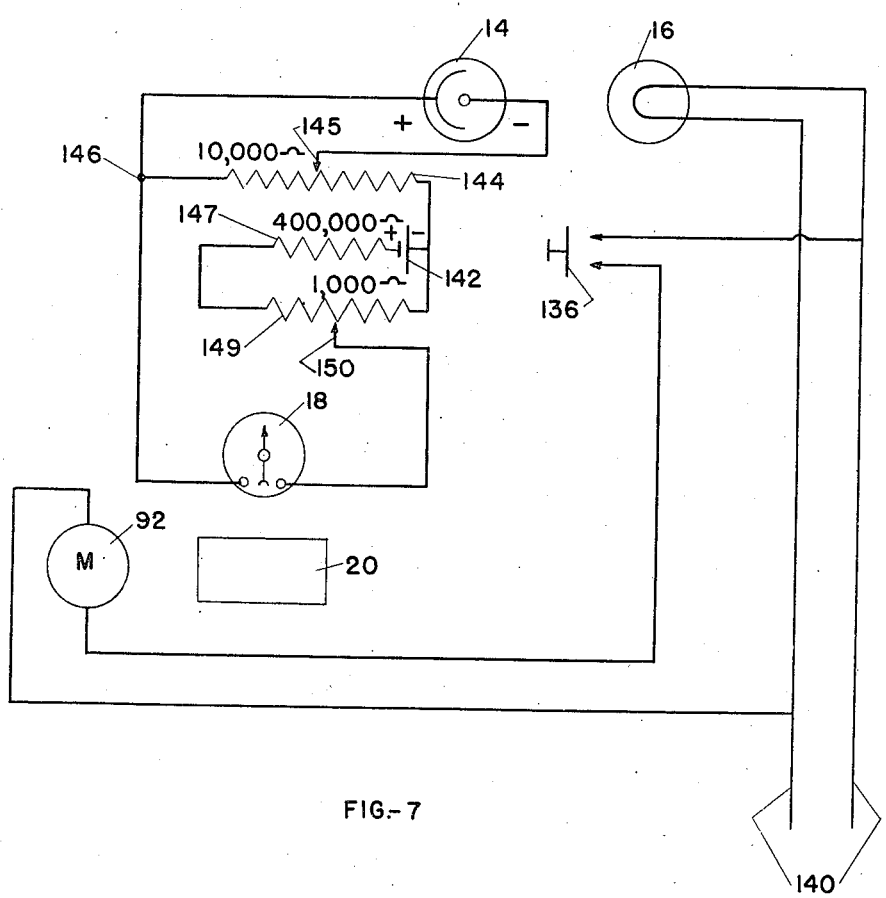
Fig. 7 is a wiring diagram illustrating the electrical connections of the apparatus.

Referring to Fig. 7, there is shown a wiring diagram illustrating the electrical connections of the apparatus. The ultra-violet light 16 and the motor 92 are connected to a supply of electrical energy 140. The motor 92 is connected to the source of electrical energy 140 through the switch 136. The circuit containing the photocell 14 and the galvanometer 18 contains a counter electromotive force furnished by a battery 142, preferably having an E. M. F. of about 1.5 volts, which makes it possible, through adjustment of the rheostat 149, to nullify in the galvanometer any component of the current produced by the photocell. The negative terminal of the battery is connected to one end of the resistance element of a rheostat 144 which has a movable contact member 145. The contact member is connected to the negative terminal of the photocell and the positive terminal of the photocell is connected to the other end of the resistance element at 146, whereby the sensitivity of the photocell-galvanometer arrangement may be adjusted. The negative terminal of the battery is also connected to one end of the resistance element of a rheostat 149 and the other end of the resistance element is connected to a high resistance element 147 having its other end connected to the positive terminal of the battery. The galvanometer is operatively connected by connecting one terminal thereof to the photocell and rheostat connection 146 and by connecting the other terminal to a movable contact member 150 of the rheostat 149, whereby the rheostat 149 serves as a zeroizing device for the galvanometer. As illustrated in Fig. 1, the rheostat 144 and 149 may be mounted on one of the side panels 70 of the recording mechanism.

Prior to making a series of tests on a given sample, one or two trial tests are made to adjust the rheostat 144 for sensitivity. The sensitivity is adjusted by the rheostat 144 so that a very sharp and definite end point is detected and recorded when the liquid wets the indicator. The galvanometer indicator is then adjusted by the rheostat 149 so that it is near zero at the commencement of the test.

In making the tests, the indicator preferred is of the type adapted to emit a fluorescent light when wetted by or dissolved in the liquid transuding through the paper sample and excited by a beam of ultra-violet light. For example, a dye of the type produced by condensing phthalic anhydride with resorcinol (known to the trade as "Uranine B") is suitable for this purpose, because of its intense and definite change from a reddish-brown, when dry, to a strong greenish-yellow fluorescence when in dilute solution which is readily detected by the photocell. Other dyes which may be used are known commercially as "Rhodamine B," "Rhodamine B Base," "Rhodamine 6GX," and mixtures of "Quinoline Yellow Conc." and any of the rhodamine dyes.

The indicator is applied to the upper surface of the paper to be tested in a quantity which may range between about 85 and about 300 micrograms per 10 square centimeters, but which is preferably in the neighborhood of 200 micrograms. The preferred quantities of dyes can be satisfactorily applied by utilizing dyes having particles which pass through a 200 mesh screen, although preferably a dye of somewhat smaller particle size is used. The indicator dye preferably is applied to the paper with a fine camel's hair brush and the excess dye is removed by shaking the paper. The particles of the dye applied in this manner cling to the superficial fibers of the paper and provide a brilliant fluorescent effect when brought into solution.

After a sample has been prepared in the foregoing manner, and trial runs have been made to adjust the photocell, and galvanometer, a test may be made. The apparatus is operated by placing the sample 30 in the holder 12, placing the glass 32 on the sample to protect it from vapor in the atmosphere, and then electrically connecting the supply lines 140 to cause the light 16 to direct rays on the sample. The latch 117 is then released, permitting the spring 131 to raise the cup raising and lowering carriage. As the carriage rises the feet 134 release the rubber conduit 101 to permit water to flow therethrough to fill and circulate through the cups 100 and 104. When the cup 100 is raised to its uppermost position and the water therein contacts the underside of the sample, the edge of the upright carriage member 119 engages the push button 139 to close the switch 136 which in turn electrically connects the recording mechanism motor 92.

The operation of the motor causes the feed roll 86 to move the chart paper 81 longitudinally at a predetermined rate with respect to the pen 77 which draws a line thereon. At the start of the test the eyelet 76 is aligned with the indicator of the galvanometer. While the indicator remains dry only the feeble fluorescence of the sample and dry indicator is present and only a slight change in the position of the galvanometer indicator will be observed. The line S drawn on the chart paper will thus be substantially straight and vertical. Upon slight wetting of the indicator and commencement of fluorescence, the galvanometer indicator will deflect, at first slightly and then at a greater rate. The operator follows this deflection with the recording eyelet 76 by rotating the crank 79 to move the pen supporting block 74 transversely to the chart paper and keep the eyelet 76 in alignment with the galvanometer indicator.

When the water has transuded through the paper and has wetted the indicator to place the particles in solution, a sudden brilliant fluorescence is detected and the galvanometer indicator deflects very rapidly away from the zero side of the scale. In following this deflection an end point line E (which is inclined to the horizontal) is drawn by the pen on the chart. After the indicator is completely wetted, and it fluoresces with a maximum brilliance, deflection of the pointer ceases and a substantially straight and vertical line R is drawn indicating that the end of the test has been reached. The time of transudation can then be calculated by observing the number of divisions on the chart paper, representing units of time, between start of the test and the end point.

The cup assembly carriage is then lowered manually and is locked in its lower position by the latch 117. Lowering of the carriage causes the switch to open to stop the motor 92, while the foot 134 pinches the inlet conduit 101 to stop circulation of water in the cups.

From the foregoing description it will be seen that the present invention provides a simple, inexpensive and reliable apparatus for testing the resistance of paper to water transudation. Personal error is eliminated and all tests can be standardized. By utilizing a photocell and a galvanometer the end point of transudation can be very accurately observed even by unskilled operators. Also no personal judgment is required, thereby enabling all operators to get the same results for any given sample. The parts of the apparatus are rugged in construction and can readily withstand any rough usage to which they may be subjected. The apparatus furthermore is compact and portable and does not require numerous adjustments prior to making the tests. The apparatus is particularly useful where a large number of samples must be tested and rapidity and accuracy are both of utmost importance.

As various changes may be made in the form, construction, and arrangement of the parts herewithout departing from the spirit and scope of the invention and without sacrificing any of its advantages, it is to be understood that all matter herein is to be interpreted as illustrative and not in a limiting sense.

What I claim and desire to protect by Letters Patent is:

1. In a device for measuring the liquid resistance of paper, the combination of a paper sample support, a source of ultra-violet light mounted above and directed towards said support, a vessel movably mounted beneath said support and adapted to be raised so that water contained in said vessel may be brought into contact with the bottom side of a paper sample mounted in said support, a photocell mounted above said support in such manner as to receive fluorescent light emitted by said paper sample, an optical filter mounted between said support and said photocell and adapted to permit substantially only fluorescent light to pass therethrough, and a galvanometer in circuit with said photocell.

2. In a device for measuring the liquid resistance of paper, the combination of a paper sample support, a source of ultra-violet light mounted above and directed towards said support, a vessel movably mounted beneath said support and adapted to be raised so that water contained in said vessel may be brought into contact with the bottom side of a paper sample mounted in said support, an annular photocell mounted between said support and said light source in such manner that the beam of light emitted by the light source passes through the opening in said annular photocell, an annular optical filter mounted between said photocell and said support and disposed coaxially adjacent to said photocell, said filter being adapted to permit substantially only fluorescent light to pass therethrough, a substantially cylindrical housing surrounding said photocell and filter and extending downwardly towards said support and having the lower portion of its interior surface curved inwardly in order to reflect light upwardly on to said photocell, and a galvanometer in circuit with said photocell.

3. In a device of the class described, the combination of means for supporting an object having a substance applied to the top side thereof adapted to emit a fluorescent light when wetted, means adapted to position a liquid surface in contact with the underside of said object, said positioning means including cup members connected for liquid inter-communication, one of said cup members being provided with overflow means positioned at a level below liquid level in the other of said cup members whereby said liquid surface may be constantly flushed under a predetermined hydrostatic head during contact of said liquid surface with said object.

4. In a device for measuring the liquid resistance of paper, the combination of means for supporting a sample of paper having a substance applied to the top side thereof adapted to emit a fluorescent light when wetted, means for activating said substance, a photocell for detecting said fluorescent light, means for recording the intensity of the fluorescent light as a function of time, means beneath the sample for wetting the underside of said sample, and pivot means biased upwardly under dash-pot control for moving the wetting means upwardly to wet said sample.

5. In a device of the class described, the combination of means for supporting an object having a substance applied to the top side thereof adapted to emit a fluorescent light when wetted, means adapted to position a liquid surface in contact with the underside of said object, said positioning means including cup members connected for liquid inter-communication, one of said cup members having a rim and being provided with overflow means whereby said liquid surface may be constantly flushed over the rim of said cup, said rim being lower than the liquid surface level in the other of said cups, whereby said liquid surface is maintained in contact with said object under a constant pressure.

6. In a device of the class described, the combination of means for supporting an object having a substance applied to the top side thereof adapted to emit a fluorescent light when wetted, means adapted to position a liquid surface in contact with the underside of said object, said positioning means including cup members connected for liquid inter-communication, one of said cups having a rim disposed at a level lower than the liquid level in the other of said cups whereby a reproducible and constantly flushed liquid surface is produced in said one cup.

JOHANNES A. VAN DEN AKKER.

CERTIFICATE OF CORRECTION.

Patent No. 2,329,959.  September 21, 1943.

JOHANNES A. VAN DEN AKKER.

It is hereby certified that error appears in the printed specification of the above numbered patent requiring correction as follows: Page 2, first column, line 51, after "on" insert --its underside--; and that the said Letters Patent should be read with this correction therein that the same may conform to the record of the case in the Patent Office.

Signed and sealed this 16th day of November, A. D. 1943.

(Seal)
Henry Van Arsdale,
Acting Commissioner of Patents.